United States Patent Office 3,424,917
Patented Jan. 28, 1969

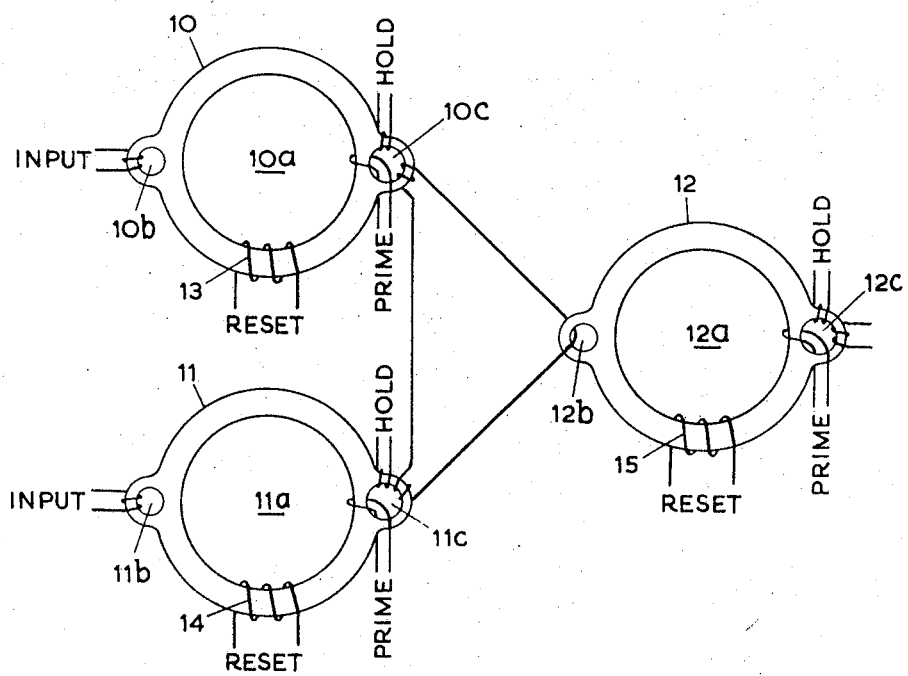

3,424,917
MAD-R MULTIAPERTURE CORE LOGIC SYSTEM
David Joseph Morris, Stoke-on-Trent, England, assignor to The English Electric Company Limited, London, England, a British company
Filed Aug. 6, 1964, Ser. No. 387,932
Claims priority, application Great Britain, Aug. 9, 1963, 31,495/63
U.S. Cl. 307—88    3 Claims
Int. Cl. H01f 27/26

ABSTRACT OF THE DISCLOSURE

A MAD–R type magnetic logic circuit consisting of a series of cores, each core having a major aperture and two minor apertures (termed input and output apertures). Adjacent cores are coupled together by isolated loops of wire, each loop passing through the aperture of one core, and the input aperture of the next. A reset winding is passed through the major aperture of each core, and each output aperture has a prime winding coupled to it. The system is operated in two phases, the reset and prime windings of alternate cores being connected in series and the two sets of reset windings being pulsed alternately. The prime windings may be pulsed shortly before the corresponding reset windings or continuously energised. Each time a prime winding is energised, the next core in the register is set in accordance with the state of the core whose prime winding was energised. The following reset pulse clears the core to a reference state, ready to be set from the preceding core in the register.

---

This invention relates to magnetic logical systems for producing in an output circuit electric signals representing logical functions of input data signals presented to input circuits.

According to the present invention such a magnetic logical system comprises a plurality of multi-aperture cores of a magnetic material having a substantially rectangular hysteresis loop, one of the cores being an output core, and at least two others of the cores being input cores (referred to hereafter as the first and second input cores respectively), each such core including an output aperture and at least one input aperture, the apertures in each core being disposed so that a reversal of magnetic flux adjacent an input aperture effects a reversal of magnetic flux adjacent part only of the output aperture, reset circuit means associated with all of the cores for establishing on pulsed energisation thereof a predetermined magnetic flux pattern in each of the cores in relation to the input and output apertures thereof, first input circuit means linking with the input aperture or apertures of the first input core for receiving a first input signal or group of input signals and for causing in response to the first input signal or a predetermined logical combination of the first group of input signals a reversal of magnetic flux adjacent part only of the output aperture of the input core, second input circuit means linking with the input aperture or apertures of the second input core for receiving a second input signal or group of input signals for causing in response to the second input signal or a predetermined logical combination of the second group of input signals a reversal of magnetic flux adjacent part only of the output aperture of the second core, first priming circuit means linking with the output apertures of the input cores for causing on energisation thereof a reversal of the flux condition around the respective output apertures of the input cores only after the occurrence of a first flux reversal caused by an input signal or signals, transfer circuit means comprising a closed electric circuit of wire only linking the output apertures of the input cores and the input aperture of the output core whereby on induction of a current in the transfer circuit means by the input cores to cause a reversal of magnetic flux adjacent part only of the output aperture of the output core, second priming circuit means linking with the output aperture of the output core for causing on energisation thereof a reversal of the flux condition around the output aperture of the output core only after the occurrence of a first flux reversal caused by an induction of current in the transfer circuit means, and output circuit means for linking an input aperture of another multi-aperture core device and comprising wire only, the output circuit means linking with the output aperture of the output core in a manner so as to produce output signals in response to reversals in magnetic flux adjacent the output aperture resulting from energisation of the second priming circuit means or of the reset circuit means.

By way of example one magnetic logical system according to the present invention is described below with reference to the accompanying drawing, which shows the system in diagrammatic form.

Referring now to the drawing the system includes three multi-aperture magnetic core devices made of a magnetic core material having a substantially rectangular hysteresis loop. The core devices comprise two input cores 10, 11 and an output core 12, each such core having a major aperture 10a, 11a, and 12a, an input minor aperture 10b, 11b, and 12b, and an output minor aperture 10c, 11c, and 12c. Reset windings 13 and 14 link with the major apertures 10a and 11a and are arranged to be energised simultaneously by "reset" current pulses, whilst a reset winding 15 links with the major aperture 12a and is arranged to be energised by other "reset" current pulses occurring alternately with the reset current pulses which energise the other two reset windings.

The input minor apertures 10b and 11b have input windings linking them with and connected in two input circuits for receiving system input data signals. Output windings linking with the output apertures 10c and 11c of the input cores are connected in series with one another in a closed electric transfer circuit which also includes an input winding which links with the input aperture 12b of the output core. This transfer circuit comprises wire only and has a predetermined resistance value determined by the gauge, material, and length of wire.

The output aperture 12c of the output core is linked by an output winding in which are developed system output signals in response to system input signals applied to the input windings of the input cores. The output circuit consists of wire only, has a predetermined resistance value determined by the gauge, material and length of wire, and links directly with an input aperture of another multi-aperture magnetic core device to be fed by the system. It should be noted that the electric transfer circuit and this "wire only" output circuit include no variable impedance amplifying devices such as transistors for amplifying the output pulses of the cores.

Each of the output apertures 10c, 11c and 12c is also linked by a "hold" winding and by a "prime" winding. The prime windings are arranged for energisation by a continuous unidirectional priming current, whilst the hold windings are arranged for pulsed energisation simultaneously with the reset windings on the next succeeding core.

In operation each of the cores behaves in the manner which is now to be described below with reference to the input core 10. The application of a reset pulse to the reset winding 13 causes the magnetic flux in the core to act in the same circumferential sense all way round the core and in all its parts, the sense being for the sake of example taken as clockwise. Thus the magnetic flux acts upwardly with reference to the drawing in both the inner and the outer flux paths which lie adjacent the input aperture 10b, and downwardly in the inner and outer flux paths which lie adjacent the output aperture 10c.

The application of an input current pulse (representing an input data signal) to the input winding causes the flux in the outer flux path adjacent the input aperture to reverse, with the consequence that the flux in the inner flux path adjacent the output aperture also reverses, independently of the flux in the associated outer flux path. Thus no output E.M.F. is induced in the output winding on application of an input signal to the input winding, so that the output winding is said to be electromagnetically isolated from the input winding, there being no electromagnetic interaction between the input and output windings of the core.

However, the reversal of the flux in the inner flux path of the output aperture results in the fluxes in both the inner and outer flux paths adjacent the output aperture being then in the same circumferential sense around that aperture. The prime winding, which is continuously energised by a suitably low value of direct current, is thereupon effective to cause a reversal of the flux around the whole of the output aperture. An E.M.F. is thereby induced in the output winding, which E.M.F. may if desired be used as an output signal. It should be noted that the energisation of the prime winding is not in itself sufficient to reverse the flux in the outer flux path of the output aperture except after an input signal has first caused the fluxes adjacent the output aperture to be of the same circumferential sense relative to that aperture.

A current pulse subsequently applied to the reset winding causes the whole of the magnetic flux in the core to revert to its former reset clockwise condition, and during this flux change the flux in the outer flux path adjacent the output aperture reverses again, thus inducing another E.M.F. in the output winding, which E.M.F. may be taken as an alternative output signal resulting from the application of an input signal to the input winding.

It will be appreciated that insofar as the output winding is electro-magnetically linked with an input aperture of a next succeeding core signals will tend to be fed back to the output winding on resetting the said next succeeding core unless means are provided to prevent this happening. The hold winding serves this purpose, and is energised to this end simultaneously with the reset winding of the said next succeeding core.

The system operates in the following manner: if input pulses are applied to either of the input windings of the input cores, after having first reset all of the cores, an output signal will be induced in the output winding of that input core, with the result that an input signal is applied by that output winding through the transfer circuit to the input winding of the output core. An output signal is therefore subsequently induced in the output winding of the output core, showing that an input signal has been received by one of the input windings of one of the input cores. Since the output windings of the input cores are connected in the electric transfer circuit so that their output signals act in the same sense, the system operates to produce system output signals representative of the logical OR function of the system input signals.

The system may be usefully modified if desired so that the output signals produced by the input cores act in the transfer circuit in opposition to one another. Thus an output signal from the output winding of core 11 tends to cancel out a simultaneous output signal from the output winding of core 10, so that no input signal is received by the input winding of the output core, and no system output pulse is produced. This modified system can therefore produce a system output signal only in response to the presence of a system input signal applied to core 10 and to the simultaneous absence of a system input signal from the core 11. In other words the system output signals produced by the modified system represent the logical INHIBIT function of the input signals, that is $A.\bar{B}$, where A and B are the system input signals.

The system described above with reference to the drawing may be extended by adding further similar input cores and associated windings for receiving other input signals and providing appropriate output signals. The output windings of the additional cores may be connected in series with those of the cores 10 and 11 in the closed transfer circuit, whereby system output signals may be produced in response to predetermined logical functions of the system input signals applied to the various input windings.

The system described above with reference to the drawing may also be extended by including in the various input and output cores other input and output apertures appropriately spaced and dimensioned so that each output winding of the various cores may have induced in it output signals representative of predetermined logical functions of the various input signals presented to the various input windings of the core.

Furthermore, each input aperture of a core may have other input windings linking therewith whereby flux changes in the inner flux path adjacent the output aperture of the core may occur in response to the resultant of the input signals applied simultaneously to the various input windings linked with that input aperture.

The particular form of multi-aperture cores 10, 11 and 12 may be replaced by other forms of cores suitable for wire only interconnections between cores.

For example the cores 10 and 11 may be replaced by button-shaped cores such as are described in my co-pending patent application Ser. No. 387,931, filed Aug. 6, 1964, to provide input signals for the input winding of the output core, each of which signals represents an AND function of two other input signals. In this case the system output signal represents an OR function of two AND functions of two system input signals for example $(P.Q) + (R.S)$.

What I claim as my invention and desire to secure by Letters Patent is:

1. A magnetic logical circuit for performing a function other than the AND function, comprising:
    a plurality of first level cores, each having:
        a major aperture;
        reset winding means coupled to the major aperture;
        an output aperture; and
        prime winding means and output winding means coupled to the output aperture;
    a second level core, having:
        a major aperture;
        reset winding means coupled to the major aperture;
        an input aperture; and
        input winding means coupled to the input aperture;
    each of the cores being capable of being set to first or second binary states;
    first drive means for energising the reset winding means of the second level core;
    second drive means for energising the reset winding means of all first level cores simultaneously subsequent to the operation of the first drive means;
    third drive means for energising the prime winding means of all first level cores simultaneously and at least subsequent to the operation of the operation of the second drive means;
    input means for setting each of the first level cores;
    coupling means coupling the input winding means and all the output winding means in an electrically isolated circuit; and
    output means for indicating the binary state of the second level core,
    characterised in that the coupling means couple the input winding means and all the output winding means in series.

2. A magnetic logical circuit in accordance with claim 1, wherein the coupling means is coupled to at least one of the first level cores in such a sense that an E.M.F. induced in the coupling means on energisation of the reset winding means of all first level cores acts to oppose the setting of the second level core to its second binary state.

3. A magnetic logical circuit in accordance with claim 1, wherein each first level core has a hold winding means coupled to the output aperture, and the circuit including fourth drive means for energising the hold winding means of all first level cores simultaneously with the operation of said output means.

References Cited

UNITED STATES PATENTS

| | | | |
|---|---|---|---|
| 2,927,220 | 3/1960 | Crane | 307—88 |
| 3,030,519 | 4/1962 | Crane | 340—174 |
| 3,290,513 | 12/1966 | Sweeney | 340—174 |

BERNARD KONICK, *Primary Examiner.*

P. SPERBER, *Assistant Examiner.*

U.S. Cl. X.R.

340—174